United States Patent
Brown et al.

(10) Patent No.: US 6,820,016 B2
(45) Date of Patent: Nov. 16, 2004

(54) LEAK DETECTION APPARATUS AND METHOD

(75) Inventors: Ian J. Brown, Cwmbran (GB); Brynley D. Smith, Cwmbran (GB); Andrew J. Williams, Cwmbran (GB)

(73) Assignee: Palmer Environmental Limited, Cwmbran (GB)

( * ) Notice: Subject to any disclaimer, the term of this patent is extended or adjusted under 35 U.S.C. 154(b) by 0 days.

(21) Appl. No.: 10/311,891

(22) PCT Filed: Jun. 20, 2001

(86) PCT No.: PCT/GB01/02728

§ 371 (c)(1),
(2), (4) Date: May 1, 2003

(87) PCT Pub. No.: WO02/01173

PCT Pub. Date: Jan. 3, 2002

(65) Prior Publication Data

US 2003/0167847 A1 Sep. 11, 2003

(30) Foreign Application Priority Data

Jun. 26, 2000 (GB) .............................................. 0015588

(51) Int. Cl.[7] .......................... G06F 17/00; G01B 5/28; G01H 3/00

(52) U.S. Cl. ............................. 702/51; 702/36; 702/54; 73/592

(58) Field of Search .............................. 702/35, 36, 50, 702/51, 54; 73/40.5 R, 40.5 A, 592; 340/605

(56) References Cited

U.S. PATENT DOCUMENTS 5,974,862 A * 11/1999 Lander et al. ........... 73/40.5 A
6,075,897 A *  6/2000 Kosugi ....................... 382/232
6,567,006 B1 *  5/2003 Lander et al. .............. 340/605

FOREIGN PATENT DOCUMENTS

DE            195 28 287 A1    2/1997

* cited by examiner

*Primary Examiner*—John Barlow
*Assistant Examiner*—Meagan S Walling
(74) *Attorney, Agent, or Firm*—Dickstein Shapiro Morin & Oshinsky LLP

(57) ABSTRACT

An apparatus and method for detecting a leak in a pipe, the apparatus comprising a sensor (11) located at a pipe (7), configured to detect a signal from the pipe, converter means to convert the signal detected by the sensor into a digital signal, and transform means to transform the digital signal into a different orthogonal space. The apparatus also comprises a transmitter (15) for transmitting the transformed digital signal back to a remote processor.

17 Claims, 3 Drawing Sheets

LEAK DETECTION APPARATUS AND METHOD

The present invention relates to the field of detecting leaks in pipes. More specifically, the present invention relates to apparatus and methods for detecting leaks which require transmission of data recorded at the pipe to a remote processor.

Fluid flowing through a pipe constantly generates an acoustic signal which propagates along the walls of the pipe and the through the fluid itself. If there is a leak in the pipe, the escaping fluid and the fluid passing over the leak, also generates an acoustic signal. Therefore, a leak can be detected by listening for such an acoustic signal.

There are known methods for accurately determining the position of a leak. For example, a popular method is to use a 'leak noise correlator'. This comprises a plurality of fixed sensors which are located at intervals along the pipe. If a leak occurs in a section of pipe between two sensors, both of the sensors detect the acoustic signal from the leak. The acoustic signal will propagate from the leak at the speed of sound in the pipe. Therefore, the time at which the two sensors detect the leak signal will depend on their relative distances from the leak. Comparing the arrival time of the leak signal at the two fixed sensors allows the position of the leak to be determined.

Generally, acoustic signals measured by the two sensors are transmitted away from the sensors to a processing unit for comparison. The acoustic signal from the leak is buried in the background acoustic signal from the pipe and is hard to extract, especially when the leak is small. Therefore, it is advantageous to process a large amount of data from the sensors in order to detect and pinpoint a leak. This causes a problem as there is a needed to transmit a large amount of data from the sensors to the remote processor.

For example, a typical leak noise correlator will require acoustic data sampling at a rate of 10 kHz. If the signal is digitised using a 16 bit analogue to digital converter, it will be necessary to transmit at least 160,000 bits per second of information for each sensor, if the pipe is to be monitored in real time. This transmission rate is beyond the capabilities of current, readily available, radio modem technology.

A lower sampling frequency could be used, but this results in a higher uncertainty in the predicted position of the leak. The data could be compressed using a standard compression technique, such as logarithmic compression. However, standard compression techniques create unacceptable loss in the resolution of the signal, which makes detection of a weak leak signal virtually impossible. Spread spectrum radio modems can transmit such a volume of data. However, they generally work at very high frequencies (typically 0.9 to 3 GHz). As a result, transmission distances can be very short, and usually, a line of sight is required between the transmitter and receiver. Therefore, they are not of use where the line of sight can be constantly interrupted by traffic and other such obstructions.

The present invention addresses the above problems and, in a first aspect provides, an apparatus for detecting a leak in a pipe, the apparatus comprising: a sensor located at a pipe configured to detect a signal from the pipe; converting means to convert the signal detected by the sensor into a digital signal; transform means to transform the digital signal into a different orthogonal space; and a transmitter for transmitting the transformed digital signal back to a remote processor.

Transforms which transform the digital data to a different orthogonal space are of particular use in processing acoustic signals from leaks. The transform should form an unconditional basis for the information. An unconditional basis results in expansion coefficients of a largely low order with a magnitude which decreases rapidly with increasing order.

The widely accepted definition of an unconditional basis follows loosely the form developed by Donoho in 1993 (D. L. Donoho, "Unconditional Bases Are Optimal Basis For Data Compression And For Statistical Estimation", Applied and Computational Harmonic Analysis, I (1): 100–115, December 1993). An unconditional basis is formally defined by considering a function class F with a norm defined and denoted by $\|.\|F$ and a basis set $f_k$ such that any function $g \in F$ has a unique representation $g = \Sigma_k a_k f_k$ with equality defined as a limit using the norm, we consider the infinite expansion:

$$f(t) = \sum_{k=-\infty}^{\infty} c_k \varphi(t-k) + \sum_{k=-\infty}^{\infty} \sum_{j=0}^{\infty} d_{j,k} \psi(2^j t - k)$$

if for all $g \in F$, the infinite sum converges for all $|m_k| \leq 1$, the basis is called an unconditional basis. Using such an unconditional basis, all subsequences of wavelets converge, and all sequences of subsequences converge. The convergence does not depend on the order of terms in the summation or on the sign of the coefficients. This implies a very robust basis, where the coefficients drop off rapidly for all members of the function class. This is the case for wavelets and leak noise data.

The transform is more preferably a discrete time wavelet transform of the form.

$$\psi(t) = e^{-t^2} \cos\left(\pi \cdot t \sqrt{\frac{2}{\ln(2)}}\right)$$

Where f(t) represents the digital data outputted from the analogue to digital conversion means and t is the time. The $\varphi(t-k)$ and $\psi(2^j t-k)$ functions represent the mother scaling functions and wavelet functions respectively which are used for the discrete wavelet transform.

The coefficients $c_k$ and $d_{j,k}$ are calculated from the inner product of f(t) with the scaling functions and wavelet functions such that:

$c_k = \int f(t) \varphi(t-k) dt$ $d_{j,k} = \int f(t) \psi(2^j t-k) dt$

As the wavelet transforms used form an unconditional basis for the data, the magnitude of expansion coefficients ($c_k$ and $d_{j,k}$ above) drop off rapidly with increasing j and k. Therefore, large numbers of the coefficient array elements are very small or zero. The coefficients are preferably calculated using a fast transform technique. In common with the classic fast Fourier transform, the technique employed in this algorithm preferably requires that the number of data points in a packet is an exact power of 2.

Preferably, the discrete wavelet transform is a Fourier transform or a wavelet which encompasses a harmonic form. For example, a Morlet wavelet which is essentially a harmonic waveform modulated by a Gaussian envelope. A generic form of a Morlet wavelet can be expressed as:

$$g(t) = \sum_k m_k a_k f_k(t)$$

More simplified forms of wavelet transforms could also be used, for example the so-called Haar transform. It is well known to those skilled in the art that the choice mother scalar function is dependent on the wavelet function.

The use of the above transform allows a data efficient compression technique to be performed before the signal is transmitted. Many known methods of comparing the signal taken from two adjacent sensors require some sort of wavelet transform to be performed on the signal (e.g. a Fourier Transform which is a specific type of wavelet transform). This is typically performed at the remote processor. Therefore, by performing the transform at the pipe, a more efficient data compression technique can be achieved without actually requiring any more processing steps.

The "raw" data can be examined at the remote processor by performing the inverse transform at the remote processor.

Preferably, the transformed signal is passed through scalar quantising means. More preferably, the quantising means is configured to optimise the number of bits, to minimise the information loss in the reconstructed datastream. In typical use, the scalar quantiser is configured such that the number of bits in the outputted data stream is two more than the number of significant bits in the raw unprocessed acoustic datastream.

For transmission, the data which is outputted either directly from the wavelet transform means or from the quantising means is preferably further compressed prior to transmission. Therefore, the apparatus preferably further comprises an encoder means for further compressing the signal prior to transmission.

Preferably, the encoder means is configured to perform a loss less data compression technique. Loss less data compression is a term which is well understood in the fields of sound and image compression etc. It is applied to the process of starting with a source of data, in digital form (either in the form of a data stream, or stored in a file) and creating a representation for the digital data, which uses fewer bits than the original. A loss less compression process is achieved when it is possible to fully recreate the original data from the representation, i.e. the compression is fully reversible.

Many types of data compression transform techniques for example hierarchical encoding such as Huffman coding, or MP3L2 (two level MPEG conversion) could be used.

Hierarchical coding is often given different names such as entropy coding, run length coding and SPIHT (set partitioning in hierarchical trees). Huffman coding is a type of hierarchical coding. The preferred compression technique is very similar to a method used in JPEG (Joint Photographic Experts Group). This uses a special form of Huffman coding. These encoding techniques are of particular use when coupled to the output of a transform means of the type described above, since the transform means produces coefficients in the detailed region of the signal which have very low values.

Thus, the encoder means is preferably configured to comprise the steps of:

a) converting digitised data into an array of numbers, each number being assigned an index;

b) determining a first threshold value;

c) locating the last number in the array which is greater than the said threshold value;

d) adding the index of the said last number onto the data stream to be transmitted;

e) adding the numbers of the array up to and including the said last number, wherein numbers below the threshold being, added as a 0 and numbers above the threshold being added as a bit number with the sign of the number being encoded in the last bit;

f) setting a second threshold value wherein said second threshold is less than the first threshold; and g) repeating steps c) to f) until a predetermined final threshold is reached.

Typically, steps c) to f) will be repeated as many times as required.

As previously mentioned, the apparatus of the first aspect of the present invention is primarily intended for use in a leak noise correlator, such a correlator will preferably comprise a plurality of sensors located on a pipe, each sensor comprising converting means to convert the signal detected by the sensor into a digital signal and transform means for transforming the digital signal into a different orthogonal space. A transmitter being provided for transmitting the transformed digital signal back to a remote processor. The remote processor being configured to compare the data received from adjacent sensors. A single transmitter may be shared between two or more sensors, or each sensor may have its own transmitter. The transmitter will generally be capable of transmitting a wireless signal.

In a preferred arrangement, the apparatus comprises both transform means and encoder means as previously described.

The remote processor may be a fixed base station. Alternatively, the remote processor could be mobile. In order to detect a leak, the mobile remote processor would have to detect a signal from at least two adjacent transmitters.

More preferably, the sensor and converter means are located in a module which is located at the pipe. The housing may be physically connected to the pipe, for example, by a magnet. The sensor may be located on the pipe or even within the pipe. For example, the sensor may be a hydrophone which extends from the module into the fluid stream of the pipe. Alternatively, the sensor may be mechanically connected to the pipe and configured to sense vibrations of the pipe itself.

A particularly preferable type of sensor is the accelerometer type of sensor. More preferably, the sensor comprises a compressible member wherein compression and expansion of the member causes an electric signal to be generated, the member being at least partially compressed when located in position at the pipe.

This may be achieved by providing the sensor in a sensor module, and providing a biasing member which is configured to bias the member against a rigid part of the sensor module. In a particularly preferred embodiment, the sensor module is provided with a compressible sealing member and said sealing member is used to bias said compressible member.

This pre-biasing of the compressible member minimises the sensitivity of the member to airborne ambient noise.

The signal from the sensor must be transmitted back to the remote processor. As the sensors will usually be located underground, the transmitter is preferably located within a box above or near the surface of the ground. The box, the sensor and the associated signal processing equipment provided between the box and the sensor form, what is called, an outstation.

Connection between the sensor and the box is usually achieved by a cable between the sensor and the box. Previously, the sensor used to transmit analogue data to the box. However, this seriously affected the signal quality which was then received by the transmitter. Therefore, preferably, at least the analogue to digital converter is located with the sensor such that digital data is communicated to the box containing the transmitter. The transform means and possibly the encoder means and/or quantising means may also be located at the sensor module such that their output is sent along the cable to the transmitter. Each sensor may have its own transmitter, or a transmitter may be configured to transmit the data from two or more sensors.

In a second aspect, the present invention provides a method of detecting a leak in a pipe, the method comprising the steps of detecting a signal from a pipe using a sensor located at the said pipe; converting the signal detected by the sensor into a digital signal; transforming the digital signal into a different orthogonal space; and transmitting the transformed digital signal. Preferably, the digital signal is transmitted back to a remote processor.

The present invention will now be described with reference to the following non-limiting embodiments in which:

FIG. 4a is a plot showing typical raw data and FIG. 4b is a plot of the transformed data of FIG. 4a.

Figure 1:
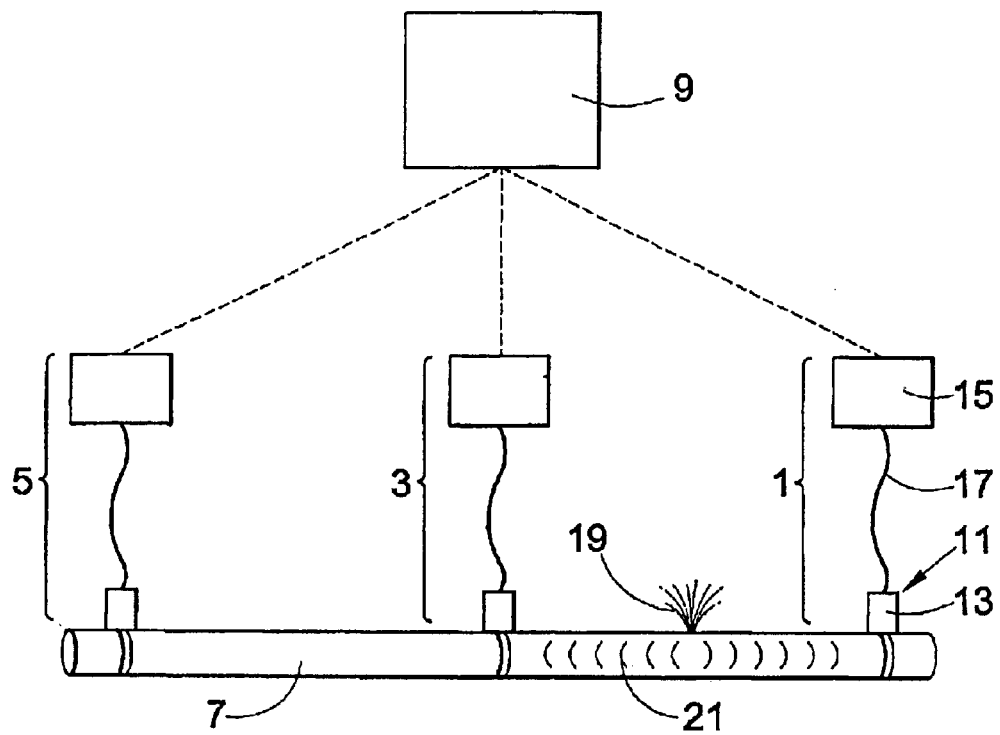
FIG. 1 is a schematic of a leak noise correlator according to an embodiment of the present invention.

A plurality of acoustic sensor assemblies 1, 3 and 5 are spaced apart along pipe 7. Each sensor assembly 1, 3 and 5 detects an acoustic signal from the pipe 7 and transmits a digital signal back to a remote processor 9. Each sensor assembly is identical. Therefore, to avoid unnecessary repetition, only the right hand sensor assembly 1 will be described.

The sensor assembly 1, comprises a sensor module 11 which is located at and attached to pipe 7. The module has a housing 13 which at least partially encloses a sensor (not shown). The sensor housing 13 is fabricated from stainless steel and is sealed to IP68 for immersion in water. The sensor continually monitors signals from pipe 7. The signals in the pipe 5 are caused by a combination of factors such as the flow of fluid through the pipe 7, the fluid escaping from a leak, traffic noise etc. Typically, the fluid will be water.

An analogue to digital converter (not shown) is also located within sensor housing 13. The analogue to digital converter is electrically connected to the sensor such that the signal which is detected by the sensor is converted into a digital form.

The signal needs to be transmitted back to the remote processor. As the pipe 7 will usually be underground, and it is not sensible to transmit the signal through the ground, the signal should be transmitted from a transmitter which is located above or close to the surface of the ground.

The transmitter which in this particular example is an amplitude shifted key (ASK) standard FM transceiver, (not shown) is located within a transmitter housing 15. The transmitter housing 15 is a shielded metal enclosure. A cable 17 which is capable of carrying a digital signal carries the digital signal from the analogue to digital converter into the transmitter housing 15. The transmitter transmits a digital signal back to the remote processor 9.

Remote processor 9 compares the signals received from the plurality of sensor assemblies 1, 3 and 5 and uses this data to determine if there is a leak. For example, in FIG. 1, leak 19 which is located between the first 1 and second 3 sensor assemblies, produces acoustic signal 21, which can be distinguished above the background acoustic signal from the pipe. The acoustic signal 21, due to the leak, propagates towards both the first 1 and second 3 sensors. Leak 19 is closer to the first sensor 1 than it is to the second sensor 3. Therefore, the acoustic signal 21 due to the leak will reach the first sensor 1 before it reaches the second sensor 3.

By measuring the time delay between these two signals using remote processor 9, the exact position of the leak 19 can be determined.

A signal due to a leak can be very weak. Also, it is necessary to regularly sample the acoustic signal in the pipe to accurately determine the time delay between the arrival of leak acoustic signal 21 at sensors 1 and 3. Typically, each sensor 1, 3 and 5 will need to sample the pipe at a rate of about 10,000 Hz. If the signal is digitised at 16 bits, then it is necessary to transmit at least 160,000 bits per second of information for each sensor. This transmission rate is beyond the capabilities of current, readily available radio modem technologies. Therefore, the data is transform coded prior to transmission.

Figure 2:
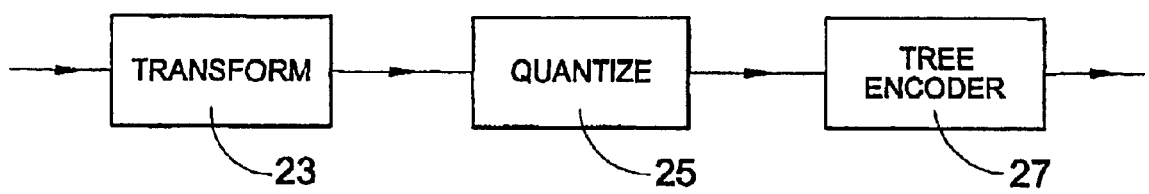
FIG. 2 is a flow diagram used to illustrate a method according to an embodiment of the present invention.

FIG. 2 shows a flow diagram showing how the digital signal which is obtained from the analogue to digital converter is transformed and compressed ready for digital transmission. Typically, the means to compress the signal will be located within sensor housing 13 or within transmitter housing 15.

Figure 3:
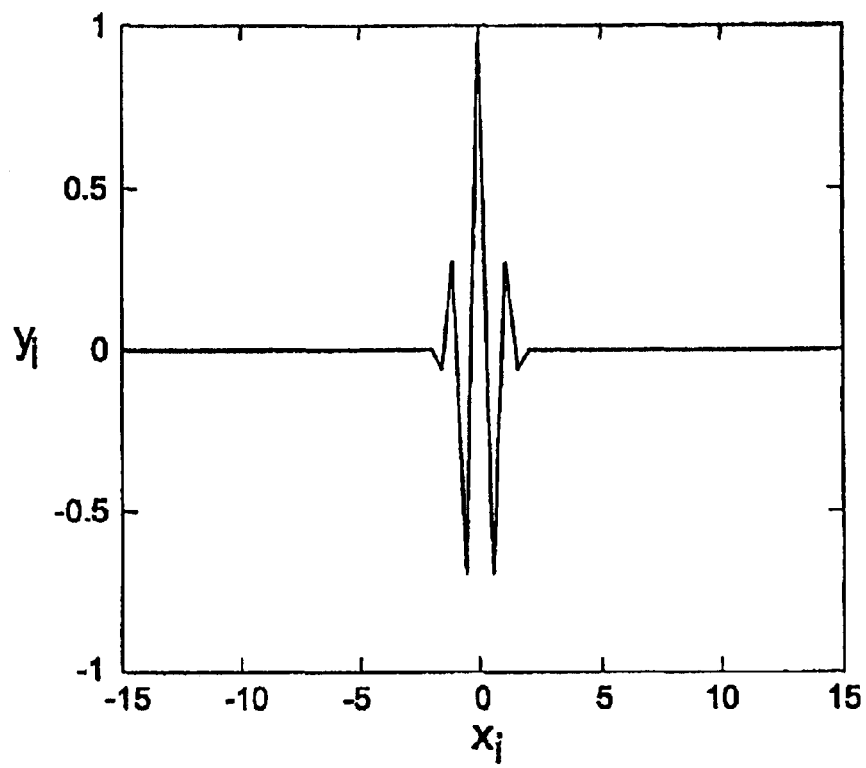
FIG. 3 shows a schematic of a wavelet form which can be used in an embodiment of the present invention.

The acoustic signal detected by sensor 1, 3 or 5 is digitised using an analogue to digital converter. The digitised signal is then fed into wavelet transformer 23 that forms an unconditional basis for the data transform. The wavelet transform used is given by the following generic equation:

$$f(t) = \sum_{k=-\infty}^{\infty} c_k \varphi(t-k) + \sum_{k=-\infty}^{\infty} \sum_{j=0}^{\infty} d_{j,k} \psi(2^j t - k)$$

Where f(t) represents the signal taken from the analogue to digital conversion means which is to be transformed and t is the time. The $\varphi(t-k)$ and $\psi(2^j t-k)$ functions represent the mother scaling functions and wavelet functions respectively which are used for the discrete wavelet transform. Preferably, a Fourier transform or any type of wavelet which encompasses an harmonic form. An example of such a wavelet is the Morlet wavelet which is essentially a harmonic waveform modulated by a Gaussian envelope. An example of a Morlet wavelet is shown in FIG. 3. The general form the wavelet is:

$$\psi(t) = e^{-t^2} \cos\left(\pi t = \sqrt{\frac{2}{\ln(2)}}\right)$$

The plot of FIG. 3 was generated using MathCad and shows $y_t$ against $x_i$ where and $y_t = \psi(x_i)$.

The coefficients $c_k$ and $d_{j,k}$ are calculated from the inner product of the signal (f(t)) with the scaling functions and wavelet functions.

$$c_k = \int f(t)\varphi(t-k)dt$$

$$d_{j,k} = \int f(t)\psi(2^j t-k)dt$$

In this example, the transform is performed on a Texas Instruments TMS 320VL5409 digital signal processor. The transformation can be performed using other currently available DSP chips or microprocessors.

The output from transform means 23 is then fed into scalar quantiser 25. The quantiser 25 is configured to quantise the transform coefficient $c_k$ and $d_{j,k}$ such that the number of bits minimises the information loss. Typically, the number of bits required is two more than the number of significant bits in the raw acoustic datastream.

The scalar quantisation process includes taking a set of data where each value is described by a large number of digital bits and converting the data into a new data set where each value is described by a smaller number of bits. The process is similar to rounding up or down values to the nearest integer, but is performed at a finer level of detail.

The output from the quantiser is then fed into the tree encoder 27.

The encoder 27 uses a loss less encoding technique such as Huffman/minimum entropy tree coding technique to compress the data. The coefficients obtained from the transform means 23 which have been quantised by quantising means 25 are used as the input for the encoder. In this example, the representation of each coefficient will be 16-bit signed number. The leading bit will represent the sign and the next 15 bits will represent the magnitude. Therefore, the individual elements can have values from $-(2^{15}-1)$ to $+(2^{15}-1)$.

A first threshold magnitude of $2^{14}$ is set. Ignoring the sign bit, the encoder finds the last element in coefficient array which has a magnitude greater than that of the threshold. The index (N.B. not the value of the coefficient) of this last element in the coefficient array is added to the transmitted datastream.

A value for each element up to and including the above element index is coded onto the end of the transmitted datastream, using the following code.

If the unsigned value is less than the threshold, a single zero bit is added to the transmitted string.

If the unsigned magnitude is greater than the selected threshold, the more significant bit will be 1. A 16 bit number is added to the datastream with sign bit as the last bit.

A second threshold value of $2^{13}$ is then set and the coding procedure is repeated. However, in this case, only the elements that were considered insignificant in the previous step are used.

The process is then repeated for a threshold of $2^{12}$, $2^{11}$ etc.

Inside the processor, the peak in the calculated cross correlation determines the time delay between acoustic noise from the leak arriving and the sensors 1, 3. Therefore, knowing the velocity of sound in the pipe, plus the distance between the sensor position, the position of the leak can be calculated.

Figure 4A:
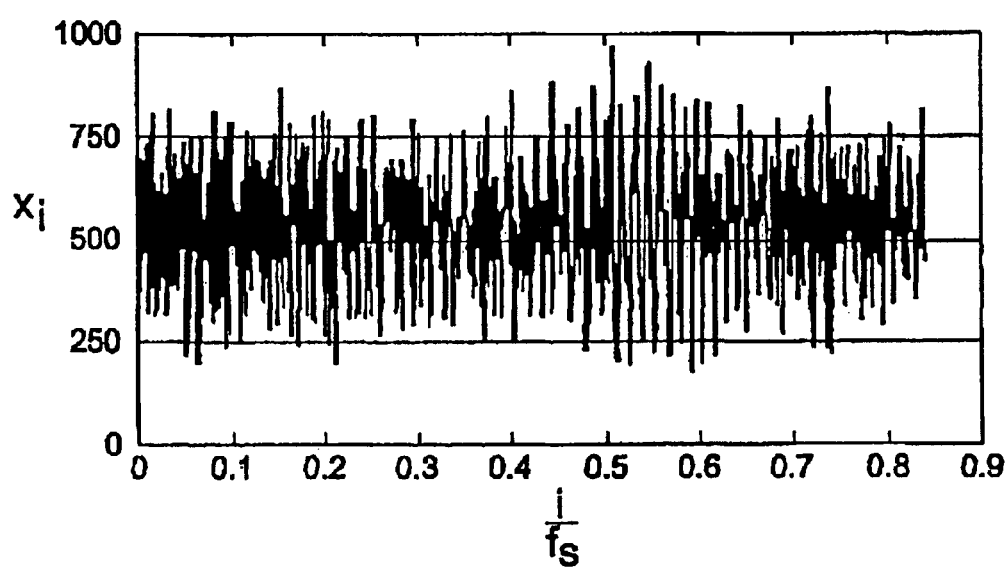

FIG. 4a shows raw data which was measured on a PVC pipe. The data was taken in 1892 sample packets (in this example, this Figure must be exact power of 2), 16 bits per sample, at a sampling frequency of 9750 Hz. The number of data bit required to transmit each packet without compression is 8192×16=131072

Figure 4B:
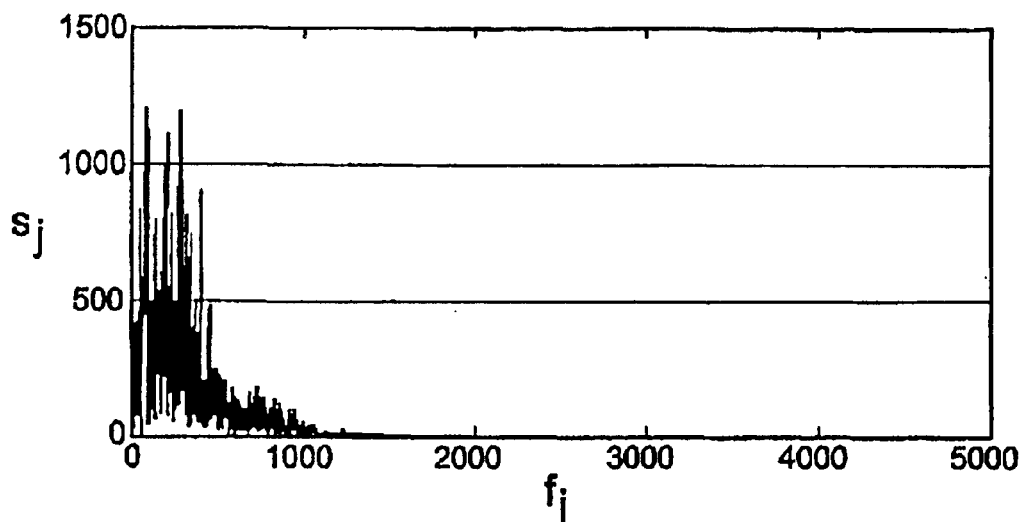

The data is extracted into arrays x and y and a fast Fourier transform is then calculated. A plot of the transform data is shown in FIG. 4b.

To calculate the Fourier transform, the DC element (i.e. offset from zero on the y-axis) is set to zero to remove any non zero DC offset in the data. The complex arrays "$s_j$" produced by the fast Fourier transform program will contain the fast Fourier transform of the data. FIG. 4b shows a plot of $s_j$ against frequency $f_j$. It can be easily seen from the plot of transform data (FIG. 4b) that the transform coefficients fall off very rapidly with increasing frequency.

The data is then scalar quantised such that all of the transform coefficients with a frequency greater than 1500 have an amplitude of 0. The value of 1500 specific to this example is chosen so that no information is lost. Then, the number of bits required to transmit the compressed data is calculated. This is calculated by mathcad using the expressions:

$$cut = floor\left[1500 \cdot \frac{8192}{9750}\right] = 1260$$

The bits required to transmit the compressed data is given by 'b' where $$b = \left[\sum_{j=1}^{cut}\left(floor\left(\frac{\ln(|Re(s_j)|)}{\ln(2)}\right) + floor\left(\frac{\ln(|Im(s_j)|)}{\ln(2)}\right)\right)\right]$$

| | |
|---|---|
| Bits required to transmit compressed data | b = 9797 |
| Bits required to transmit the uncompressed data | 131072 |
| Compression factor | $\frac{131072}{9797} = 13.4$ |

The number of bits required to transmit the compressed data is 9,797. This is a reduction factor of more than 13 to 1. This compression value is typical for a transform coder utilising the Fourier transform.

The compression values obtained using wavelet transforms in general are typically in the range from 10 to 1, to 20 to 1.

Figure 5:
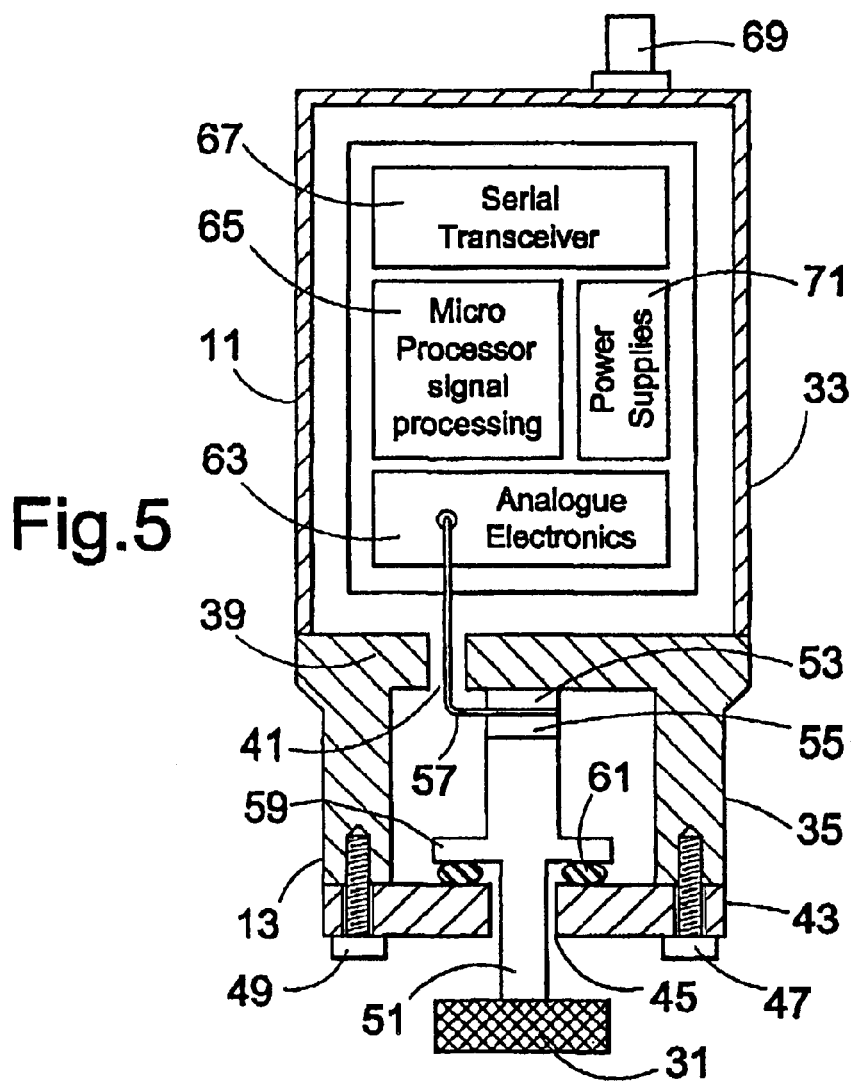
FIG. 5 is an example of an accelerometer which can be used with an embodiment of the present invention.

FIG. 5 shows a detail of sensor module 11. The sensor module 11 is fixed onto the pipe (not shown) using magnet 31. The module 11 essentially has two main parts, an upper part 33 which mainly comprises data acquisition and signal processing hardware and a lower part 35 which mainly comprises the sensor itself.

First, the lower part 35 of the module will be described. The lower part 35 of the module 11 has a hollow housing 13 with cylindrical side walls 37 and an upper plate 39 which is integral with the side walls. An aperture 41 is provided off centre in the upper plate 39. The aperture 41 extends through the upper plate 39 to provide a pathway between the upper part 33 and the lower part 35. A lower base plate 43 which is provided with a circular central aperture 45 is attached to the cylindrical side walls 37 via bolts 47, 49.

Magnet 31 is located outside the housing 13 below the base plate 43. The magnet 31 is attached a rigid plunger member 51 which extends upwards through the aperture 41 of base plate 39.

A plurality of piezo electric cylindrical disks 53, 55 are located on the upper end of the plunger 51, such that piezo disks 53, 55 are interposed between the plunger 51 and the upper plate 39. In this example, the piezo electric disks 53, 44 are made from Lead Zirconia Titanate (PZT) grade 5A. A copper electrode disk 57 is provided interposed in the stack of piezo disks 53, 55. A wire 59 is connected to the copper electrode disk 57 and extends through aperture 41 in upper plate 39.

Plunger 51 is provided with circumferential protrusion 59 about its elongate axis, on the part of the plunger 45 which is located within the housing. The protrusion 59 extends radially beyond the edge of the central aperture 45 such that it overlaps with the base plate 43. An elastomeric O ring 61 is located between the protrusion 59 and the base plate 43. The elastomeric ring 61 is compressed and performs the functions of both sealing the gap between the protrusion 59 and the aperture 45 and also pre-loads the piezo electric disks 53 and 55 so that they are forced against the upper plate 39. The piezo electric disks 53, 55 are hence permanently compressed. The pre-load force on the disks 53, 55 is controlled and regulated by the amount of compression of the elastomer ring 61.

Vibrations in the pipe due to the flow of water through the pipe and possibly due to leaks are carried along the pipe (not shown) and will cause the magnet 31 to vibrate. This in turn causes vibration of the plunger 51. Vibration of the plunger causes compression of the piezo electric disk 53, 55 which generate an electric signal. This signal is picked up by electrode 57 and fed into wire 57 which extends through the aperture 41.

The biasing of the piezoelectric member has been found to reduce problems due to the sensor picking up airborne due to noise which is not from the pipe.

The upper part of the housing 33 comprises an analogue electronics portion 63 which converts the electrical signal carried by wire 57 into a digital signal for processing. The analogue electronics portion comprises a 16 bit or 24 bit sigma delta A to D converter. The digital signal is then transformed and compressed as explained in relation to FIG. 2 using microprocessor 65, ready for sending to the transmitter which will be located at the surface. The signal is sent by transceiver 67 which may be a standard RS485 or RS422 digital transceiver. The signal will be outputted to a cable using connector 69. A power supply 71 for the electronics of the system is provided in the upper part 33 of the housing.

What is claimed is:

1. An apparatus for detecting a leak in a pipe, the apparatus comprising:
   a sensor located at a pipe configured to detect a signal from a pipe;
   converter means to convert the signal detected by the sensor into a digital signal;
   transform means for transforming the digital signal into a different orthogonal space; and
   a transmitter for transmitting the transformed digital signal back to a remote processor;
   wherein the transform means is configured to perform a wavelet transform in which the digital signal is transformed according to the general formula:

$$f(t) = \sum_{k=-\infty}^{\infty} c_k \varphi(t-k) + \sum_{k=-\infty}^{\infty} \sum_{j=0}^{\infty} d_{j,k} \psi(2^j t - k) \quad (1)$$

where (ft) represents the digital signal outputted by the analogue to digital conversion means, t is the time, $\phi(t-k)$ and $\psi(2^j t-k)$ functions represent the mother scaling functions and wavelet functions repsectively and the coeffricients $c_k$ and $d_{j,k}$ are calculated from the inner product of f(t) with the scaling functions and wavelet functions respectively such that:

$c_k = \int f(t)\phi(t-k)dt$ $d_{j,k} = \int f(t)\psi(2^j t-k)dt$.

2. An apparatus according to claim 1, wherein the transform means uses a transform which forms an unconditional basis for the signal.

3. An apparatus according to claim 1, wherein the transform means is configured to perform a Fourier transform.

4. An apparatus according to claim 1, wherein the wavelet function has substantially a harmonic form.

5. An apparatus according to claim 1, wherein the output from the transform means is directed into a scalar quantiser which is configured to quantise the data.

6. An apparatus according to claim 1, wherein the sensor and the converter means are provided in a sensor module located at the pipe.

7. An apparatus according to claim 6, the transmitter being connected to the sensor via a cable which is capable of carrying digital signals.

8. A corrrelator for detecting and determining the position of a leak in a pipe, the correlator comprising:
   a plurality of apparatus according to claim 1,
   a remote processor capable of receiving a signal transmitted from at least two adjacent apparatus and which is capable of comparing the signals received from the two adjacent apparatus.

9. A correlator according to claim 8, wherein the remote processor is capable of receiving signals from the at least two apparatus when the remote processor is moving.

10. An apparatus for detecting a leak in a pipe, the apparatus comprising:
    a sensor located at a pipe configured to detect a signal from a pipe;
    converter means to convert the signal detected by the sensor into a digital signal;
    transform means for transforming the digital signal into a different orthogonal space; and
    a transmitter for transmitting the transformed digital signal back to a remote processor;
    further comprising encoder means for compressing the signal from the transform means, wherein the encoder means is configured to perform a loss less compression technique, wherein the loss less compression technique is a hierarchical coding technique comprising Huffman coding or a technique based on Huffman coding and wherein the encoding technique comprises the steps of:
    a) converting digitised data into an array of numbers, each number being assigned an index;
    b) determining a first threshold value;
    c) locating the last number in the array which is greater than the said threshold value;
    d) adding the index of the said last number onto the data stream to be transmitted;
    e) adding the numbers of the array upt to and including the said last number, wherein numbers below the threshold being added as a 0 and numbers above the threshold being added as a bit number with the sign of the number being encoded in the last bit;
    f) setting a second threshold value wherein said second threshold is less than the first threshold; and
    g) repeating steps c) to f) until a predetermined final threshold is reached.

11. A corrrelator for detecting and determining the position of a leak in a pipe, the correlator comprising:
    a plurality of apparatus according to claim 10,
    a remote processor capable of receiving a signal transmitted from at least two adjacent apparatus and which is capable of comparing the signals received from the two adjacent apparatus.

12. A correlator according to claim 11, wherein the remote processor is capable of receiving signals from the at least two apparatus when the remote processor is moving.

13. An apparatus for detecting a leak in a pipe, the apparatus comprising:
    a sensor located at a pipe configured to detect a signal from a pipe;

converter means to convert the signal detected by the sensor into a digital signal;

transform means for transforming the digital signal into a different orthogonal space; and a transmitter for transmitting the transformed digital signal back to a remote processor;

wherein the sensor comprises a compressible member, wherein compression and expansion of the member causes an electric signal to be generated, the member being at least partially compressed when located in a position at the pipe.

14. An apparatus according to claim 13, wherein said sensor is provided in a sensor module, said sensor module having a biasing member which is configured to bias the compressible member against a rigid part of the sensor module.

15. An apparatus according to claim 14, wherein a compressible sealing member is provided for the sensor module, and said sealing member is used to bias said compressible member.

16. A corrrelator for detecting and determining the position of a leak in a pipe, the correlator comprising:

a plurality of apparatus according to claim 13, a remote processor capable of receiving a signal transmitted from at least two adjacent apparatus and which is capable of comparing the signals received from the two adjacent apparatus.

17. A correlator according to claim 16, wherein the remote processor is capable of receiving signals from the at least two apparatus when the remote processor is moving.

* * * * *